United States Patent [19]

De Mesmaeker

[11] 4,268,886
[45] May 19, 1981

[54] DISTANCE PROTECTION APPARATUS FOR ELECTRICAL LINES

[75] Inventor: Ivan De Mesmaeker, Fislisbach, Switzerland

[73] Assignee: BBC Brown, Boveri & Co., Ltd., Baden, Switzerland

[21] Appl. No.: 943,955

[22] Filed: Sep. 20, 1978

[30] Foreign Application Priority Data

Sep. 30, 1977 [CH] Switzerland .................. 11956/77

[51] Int. Cl.³ .............................................. H02H 7/26
[52] U.S. Cl. ......................................... 361/80; 361/82
[58] Field of Search ............... 361/80, 81, 79, 82, 361/92, 84, 68, 67; 324/51, 52

[56] References Cited

U.S. PATENT DOCUMENTS

| | | | |
|---|---|---|---|
| 3,201,651 | 8/1965 | Calhoun | 361/80 |
| 3,303,390 | 2/1967 | Sonnemann | 361/80 |
| 3,379,933 | 4/1968 | Hoel | 361/80 X |
| 4,092,691 | 5/1978 | Williams | 361/80 |

FOREIGN PATENT DOCUMENTS

| | | |
|---|---|---|
| 301669 | 11/1969 | Austria . |
| 1116785 | 11/1961 | Fed. Rep. of Germany . |
| 1175782 | 8/1964 | Fed. Rep. of Germany . |
| 2456073 | 5/1976 | Fed. Rep. of Germany . |
| 2176566 | 11/1973 | France . |
| 358150 | 12/1961 | Switzerland . |
| 391065 | 8/1965 | Switzerland . |
| 409087 | 9/1966 | Switzerland . |

OTHER PUBLICATIONS

Publication Proceedings of the IEE, vol. 113, No. 10, Oct. 1966, pp. 1631–1642, "Composite Polor Characteristics in Multizone Systems of Phase-Comparison Distance Protection".
Publications Proceedings of the IEE, vol. 114, No. 7, Jul. 1967, pp. 936–938, Disscussion on–"Composite Polar Characteristics in Multizone Systems of Phase-Comparison Distance Protection".
Brown Boveri Review–"Protective Relays for Electrical Installations", vol. 53, pp. 737–872, Nov.–Dec. 1966, No. 11/12.

Primary Examiner—Patrick R. Salce
Attorney, Agent, or Firm—Werner W. Kleeman

[57] ABSTRACT

By switching-in a trip boundary, which excludes the load range in the complex impedance plane, of a directed or non-directed end or final stage of a measuring system of a distance protection apparatus, it is possible to eliminate faulty or spurious triggering of the protection apparatus, notwithstanding a possible improper excitation. The functional reliability of the protection apparatus is thus improved and there is possible monitoring of fault functions where, in each case, there is logically coupled a "yes" or "no"-type output response of the measuring system with a "no" or "yes"-type excitation output by means of appropriate and comparison logic circuitry.

5 Claims, 4 Drawing Figures

DISTANCE PROTECTION APPARATUS FOR ELECTRICAL LINES

BACKGROUND OF THE INVENTION

The present invention relates to a new and improved construction of a distance protection apparatus for electrical lines or networks.

Generally speaking, the distance protection apparatus for electrical lines, of the present development, is of the type comprising a starter circuit responsive to at least one predetermined fault criterion, and at least one measuring circuit whose characteristic, in the complex impedance plane, can be switched between a number of distance-trigger or trip boundaries. This switching of the characteristic of the measuring circuit and the distance measuring system contained therein corresponds to the generally known staggered protection operation. During performance thereof, the distance-trip boundaries and thus the boundary limits at the line to be protected are increased in steps or increments after successive time-intervals for the response or non-response of the measuring circuit, until the response of the measuring circuit has been accomplished by producing a trigger or trip signal. The trip signal, which causes shutdown of the line section at which there appears the fault, is thus dependent upon the presence of an excitation signal delivered by the starter circuit, i.e. a signal indicating that the fault has not yet been turned-off by another protection station and thus has been overcome. In this way there can be achieved the result that, from a number of protection stations, whose maximum trigger or trip region covers a predetermined line or network region, that protection station always initially responds where the fault lies within the zone boundaries closest to the relevant station. In this way there is realized minimumization of the line or network region affected by the switching-off operation and there is achieved as rapid as possible shutdown of the faulty line section.

In the final stage of a measuring circuit or a measuring system the trip boundaries which, in the complex impedance plane intersect the reactance axis and the resistance axis (reactance boundary and resistance boundary, respectively), are generally shifted to infinity, so that—to the extent present—only the trigger boundaries of a directional element (directional boundaries) passing through the coordinate null point or passing such at only a slight spacing become effective. The reactance, resistance and directional-boundaries moreover can be united into a uniform, geometrically defined line course, for instance, with the known measuring circuits having circular characteristic, in other words in contrast to the likewise known polygonal or quadrilateral characteristics where the aforementioned boundaries are each formed by a line section.

In the case of measuring circuit-end stages without any directional element, so-called non-directed or non-directional end stages, which cause purely a release or switching-through of the excitation signal as a trip signal, and also with the heretofore known end or final stages having conventional directional elements, extreme, but in fact still permissible loads, only then do not cause a faulty or spurious tripping operation when the excitation circuit, i.e. the fault-protection element of the starting circuit, can decide with adequate accuracy and reliability between such extreme load conditions and short-circuits which constitute real faults. The probability of spurious tripping is thus only conditionally limited with the heretofore known circuits and only can be reduced by using comparatively great circuit expenditure.

SUMMARY OF THE INVENTION

Hence, it is a primary object of the present invention to provide a new and improved construction of distance protection apparatus for electrical lines which, without requiring any appreciable circuit expenditure, affords increased security against faulty tripping or triggering operations.

Still a further significant object of the present invention aims at the provision of a new and improved construction of distance protection apparatus for electrical lines which is relatively simple in construction and design, economical to manufacture, highly reliable in operation, not readily subject to breakdown or malfunction, and increases the probability of only disconnecting a line section or network in the event of an actual fault.

Now in order to implement these and still further objects of the invention, which will become more readily apparent as the description proceeds, the distance protection apparatus for electrical lines of the present development is manifested by the features that, there is provided a starter circuit having an excitation circuit responsive to at least one predetermined fault criterion, and at least one measuring circuit whose characteristic can be switched in the complex impedance plane, at least in sections or stages between a number of distance-trip boundaries and contains at least one linear section which passes at least approximately through the null point of the impedance plane. For the switching stage of the measuring system having the largest zone boundary (final or end stage) the linear boundary extending through the null point is located externally of the load range of the line.

In accordance with the teachings of the invention, due to simple incorporation of a trip boundary which excludes the load range there is practically completely eliminated any faulty or spurious tripping in the final stage. This construction of the final or end stage, with a directional element which is present in any event, can be obtained by a simple modification of the trip boundary switching and with non-directed final or end stage by retaining an appropriate characteristic section from a preceding trip boundary setting. In this regard there can be basically undertaken an end stage modification, in the previously mentioned sense, which remains effective simultaneous with the switching-on of the end or final stage. On the other hand, it is possible under circumstances and advantageous to render such modification effective only for a part of the time duration of the switching-in of the end stage, especially with a time-delay in relation to the switching-in of the end stage, so that both types of function are available for evaluation purposes.

A decisive further construction of the invention is manifested by the features that a monitoring circuit is provided having a first comparison logic, which, at the input side, is connected with an output of the starter circuit and with an output of the measuring circuit and in the event of response of the excitation circuit in conjunction with non-response of the measuring system arrangement produces a fault function signal. Such extremely important practical functional monitoring of the end stage is rendered possible due to the exclusion of the load range, because without such exclusion, i.e. with a response possibility of the measuring circuit in the load range the signal combination, response of the excitation circuit with non-response of the measuring circuit in the event of a faulty excitation with simultaneous presence of a permissible load condition which is adequate for response of a measuring system is prevented by the measuring system which properly responds. The exclusion of the load range from the trip region renders possible, on the other hand, a positive fault function signal in the event of faulty excitation with fault-free measuring circuit as well as in the event of a faulty response of a measuring system with correct non-excitation. The complementary fault combinations can be controlled by mutual negation and again by AND-logical coupling or compounding of the excitation and the measuring system output.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
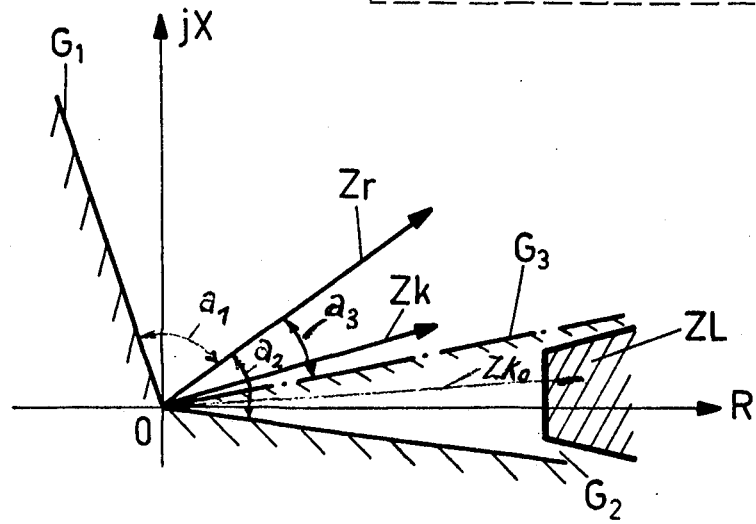
FIG. 1 illustrates the directional-trigger boundaries and the complex impedance plane for a distance protection apparatus constructed according to the teachings of the present invention.

Describing now the drawings, in FIG. 1 there is shown the directional trip or trigger boundaries $G_1$ and $G_2$ of a conventional distance protection-measuring system in the complex impedance plane with the reactance axis jX and the resistance axis R. Such trip boundaries can be realized, for instance, by determining the phase difference between a line impedance vector $Z_k$, formed in conventional manner, and a reference impedance vector $Z_r$ and comparing such phase difference with a predetermined threshold value-phase angle $a_1$ or $a_2$, respectively, which leads or lags the reference impedance vector $Z_r$. There is thus formed a trip area or region within the obtuse angle between the trip boundaries $G_1$ and $G_2$, whereas, to the other side of such trip boundaries $G_1$ and $G_2$ there is located the non-trip area or region indicated by the shaded lines. A load range or region ZL, which has been indicated by the shading in FIG. 1, is located in the usual fashion within such trip or trigger region. Now, if instead of the threshold value-phase angle $a_2$ there is introduced the illustrated angle $a_3$ of lesser magnitude for monitoring the leading phase difference of the line impedance vector $Z_k$ in relation to the reference impedance vector $Z_r$, then there is formed a new trip boundary $G_3$ which eliminates the load region or range ZL. A line impedance vector $Z_{k_o}$, located within this load region ZL, then no longer leads to response of the measuring system which should be blocked, due to the absence of an excitation signal, in order to prevent faulty or spurious tripping. Switching of the angle $a_2$ to the angle $a_3$ can be accomplished simultaneous with the switching-on of the final or end stage, or also, thereafter with a predetermined time-delay, so that both trip boundaries $G_2$ and $G_3$ are available for separate evaluation purposes.

Figure 2:
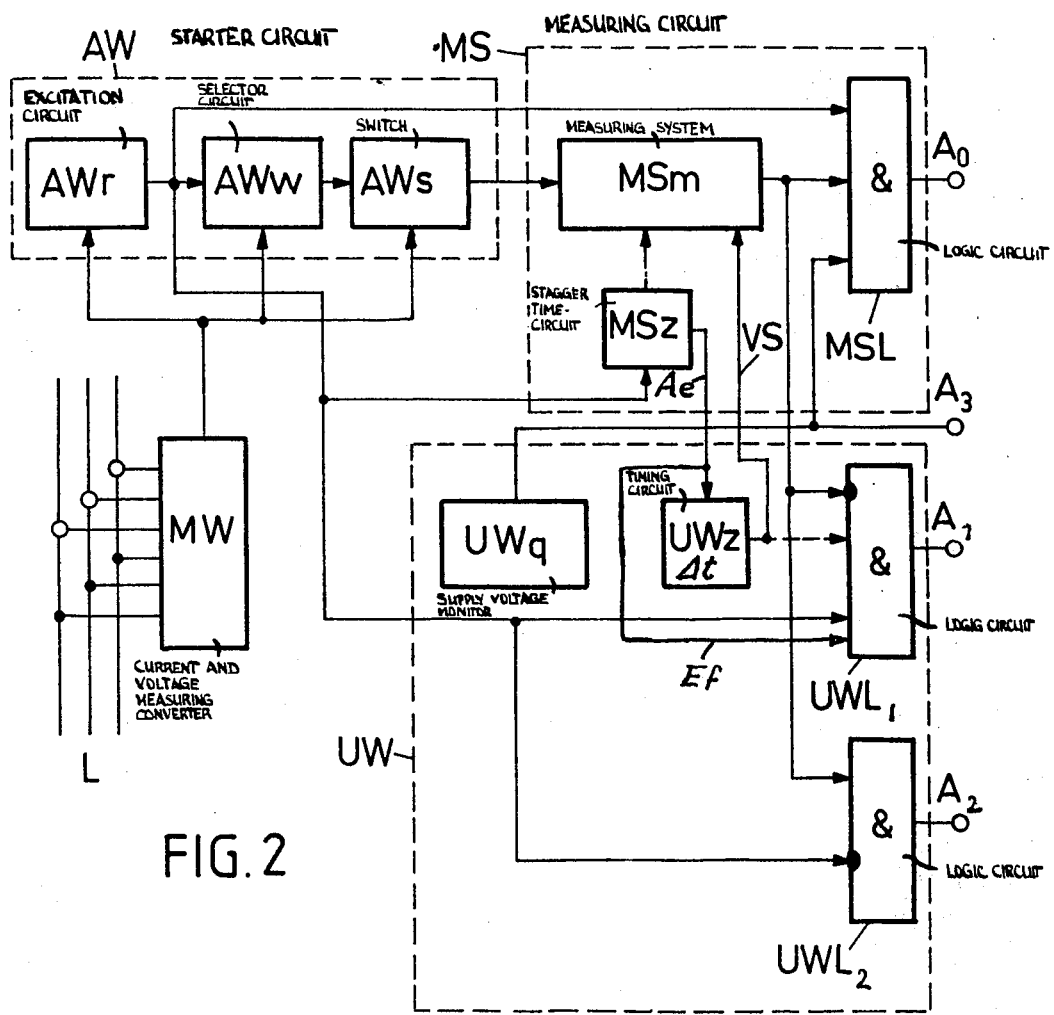
FIG. 2 is a block circuit diagram of a distance protection apparatus for the realization of the trip or trigger boundaries according to FIG. 1 and having a monitoring circuit.

The distance protection apparatus according to the circuit arrangement of FIG. 2, for realizing the aforementioned functional principle, will be seen to comprise a current and voltage-measuring converter arrangement MW connected with a three-phase line or network L. This measuring converter arrangement or system MW delivers appropriately shaped and processed measuring signals for excitation both to a starter circuit AW and to a measuring circuit MS. The starter circuit AW comprises an excitation circuit AWr which monitors the measuring signal in accordance with predetermined fault criteria, for instance, according to standard overcurrent or low-voltage criteria. Upon fault detection the excitation circuit AWr activates a subsequently connected selector circuit AWw. The latter likewise receives the measuring signals and detects the nature of the prevailing fault, whereafter a switching device or circuit AWs delivers the measuring signals, in a combination accommodated to the nature of the fault, to a measuring system arrangement or measuring system MSm contained in the measuring circuit MS, and thus, switches-on such measuring circuit MS. There is now accomplished the usual, timewise staggered, fault distance determination in the measuring system MSm. Further, a stepwise switching of the trigger or trip boundaries of the measuring system arrangement or measuring system MSm is accomplished by the stagger-time circuit MSz which has been likewise activated by the excitation circuit AWr. If a measuring system responds within one of these trip zones, then at the output of the measuring system MSm there appears a trip signal which, together with the excitation signal infed by the excitation circuit AWr, controls an AND-logic circuit MSL. By means of a monitoring circuit UW, for improving functional reliability, a further validity criterion is delivered by a supply voltage monitor circuit UWq to the AND-logic circuit MSL. Now when all of the inputs of the logic circuit MSL are driven so as to carry a logic "1" or "yes" state, then at the output $A_o$ there appears an effective trip signal for fault cut-off.

An additional time or timing circuit UWz is provided within the monitoring circuit UW for a possibly desired time-delayed switching of the end stage-trip boundaries. This timing circuit UWz is activated by a release or trigger output Ae of the stagger-time circuit MSz and which release output is operatively correlated with one of the end stage switching-in operations. This further timing circuit UWz performs the mentioned switching function after a predetermined time-delay, by means of a predetermined input VS of the measuring system arrangement MSm. It is possible to proceed in a manner such that upon switching-on the end stage there is initially activated the trip boundary which excludes the extreme load region, and thereafter, there is caused a directed or non-directed end stage setting which encompasses the load range. Thus, there is initially then formed a trip signal which for certainty has not been caused by an extreme load stage, naturally with a more limited trip area region, and then a trip signal over the entire originally contemplated trip area or region. The evaluation, depending upon the field of application, can be accomplished by appropriately storing or logically coupling the trip signals which successively follow one another. Basically, the same holds true for the reverse sequence, starting with an unmodified trip boundary and then modifying such trip boundary by excluding the extreme load range.

A first monitoring for faulty operation is undertaken with a trip boundary setting of the end stage which excludes the load range, and specifically, if desired, after suitable activation by the output of the timing circuit UWz, by means of an AND-comparison logic circuit $UWL_1$. The AND-comparison logic circuit $UWL_1$ receives, by means of suitable inputs, an excitation signal from the excitation circuit AWr and the "negated" or "no"-type response signal from the measuring system MSm, and thus, delivers to a monitoring or alarm output $A_1$ a fault function signal in the event of a faulty excitation with correct non-response of the measuring system MSm as well as faulty non-response of the measuring system in conjunction with a correct excitation.

A second AND-comparison logic circuit $UWL_2$ having a monitoring or alarm output $A_2$ receives at its corresponding inputs a "yes"-type response signal from the measuring system MSm and the "negated" or "no"-type signal from the excitation circuit AWr. At the monitoring or alarm output $A_2$ there thus appears a fault function signal whenever, with correct non-excitation, there occurs a faulty response of a measuring system or with correct response of the measuring system there is absent the excitation. The significance of this faulty function signal is not bound to the exclusion of the load range from the trip area or region of the end stage.

Furthermore, there can be dispensed with the dependency of the comparison logic circuit $UWL_1$ upon the output of the timing circuit UWz, if during the entire end stage switching-on process there is effective a trip boundary in the measuring system which excludes the extreme load range. This has been indicated by the broken line portrayal of the connection between the circuits UWz and $UWL_1$. In order to couple monitoring with the end stage setting, there is provided in the circuit of FIG. 2 its own release or activation input Ef for the comparison logic circuit $UWL_1$, which, just as for the excitation input of the circuit UWz, is connected with the aforementioned output Ae of the stagger-time circuit MSz.

Figure 3:
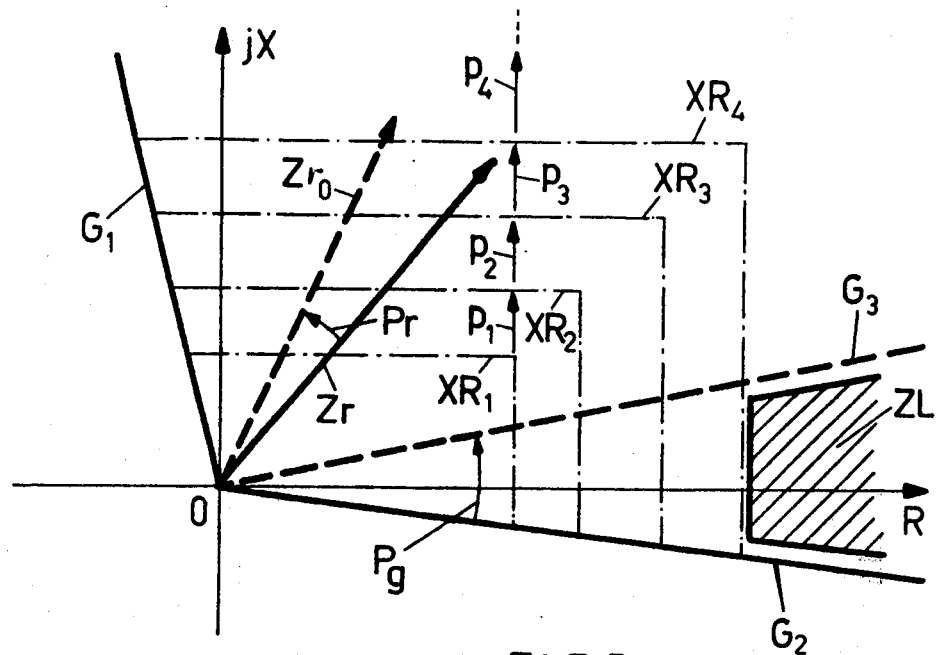
FIG. 3 illustrates the characteristic of another embodiment of the invention in the complex impedance plane with exclusion of the load region by switching a reference impedance.

In the diagram of FIG. 3 there is shown a further possibility of switching the trip boundary of the final or end stage. While for the original trip boundary $G_2$, which encompasses the extreme load range ZL, together with the trip boundary $G_1$ there can be formed by phase angle monitoring a line impedance (here not shown) in relation to the reference impedance Zr, it is possible to obtain the modified trip boundary $G_3$, which eliminates the extreme load range, by means of a reference impedance $Zr_o$ which is phase-shifted in accordance with the arrow Pr in relation to the original reference impedance Zr. Further, while maintaining the trip boundary $G_1$ there is reduced the phase angle between the reference impedance $Zr_o$ and the trip boundary $G_1$, on the one hand, and the trip boundary $G_3$, on the other hand, approximately in the same relationship as with respect to the unmodified phase angle. In this way there is obtained the requisite phase shift of the trip boundary $G_3$ in relation to the trip boundary $G_2$ in accordance with the arrow Pg.

Additionally, in FIG. 3 there are portrayed different reactance and resistance trip boundaries $XR_1$ to $XR_4$ which have been switched-in in a timewise staggered relationship. Starting from the trip boundary $XR_1$ there is accomplished, during each staggered switching operation, the transition to the next trip boundary according to the arrows $p_1$ to $p_4$, and the last-mentioned switching operation to the final stage is accomplished with reactance and resistance trip boundaries which have been shifted to infinity, that is to say, ineffectual reactance and resistance trip boundaries.

Figure 4:
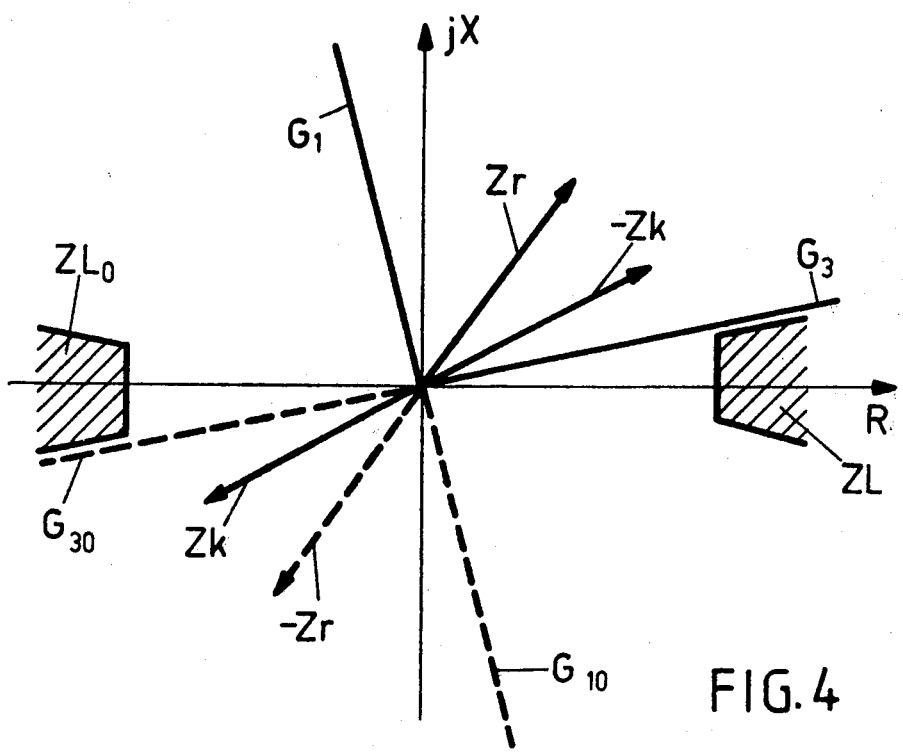
FIG. 4 is a graphic illustration of the characteristics of a further embodiment of the invention having null point-symmetrical switchable directional trip area or region in the complex impedance plane.

With the embodiment of FIG. 4, likewise constituting a characteristic illustration in the complex impedance plane, switching occurs between trip areas or regions which are mutually null point symmetrical. These trip areas or regions are located between the trip boundaries $G_1$ and $G_3$, on the one hand, and the trip boundaries $G_{10}$ and $G_{30}$, on the other hand. The transition between both of these trip areas or regions can be accomplished in a simple manner by a 180°-phase shift of the reference impedance Zr towards −Zr, or, however, by appropriate phase shift of the line impedance Zk towards −Zk. This transition moreover means that there is accomplished an appropriate transformation of the load region ZL into the region $ZL_o$. Both regions are connected by the corresponding trip boundaries $G_3$ and $G_{30}$, respectively.

This switching operation can be performed by a circuit arrangement according to FIG. 2 by means of the timing circuit UWz, i.e. with a predetermined time-delay Δt after switching-in the end stage of the measuring system arrangement MSm. In the time interval between switching-in of the end stage and the switching operation there is then effective the trip region which is correlated to the one direction of power flow and in the time interval which follows the switching operation, in other words likewise within the end stage switching-in operation, there is effective the trip region which is correlated to the opposite direction of power flow. Thus, in a most simple manner there are realized two mutually complementary directional detections which are employed for particular monitoring or protection purposes, especially however there also can be realized the function of a non-directed end stage which is desired in certain cases.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A distance protection apparatus for electrical lines, comprising:

a starter circuit having an output and containing an excitation circuit responsive to at least one predetermined fault criterion appearing at least at one of the electrical lines;

at least one measuring circuit having a characteristic in the complex impedance plane which can be switched at least in sections between a number of distance trip boundaries and having at least one linear section which extends at least approximately through the null point of the impedance plane;

said measuring circuit having an output side and containing a measuring system;

said measuring circuit further having a switching stage for the greatest zone boundary;

said switching stage constituting an end stage whose linear trip boundary extending through the null point of the impedance plane is located externally of the load range of the electrical line;

a monitoring circuit having a first comparison logic means, said comparison logic means having an input side and an output side; and the input side of said first comparison logic circuit being connected with the output of the starter circuit and with the output side of the measuring circuit and in the event of response of the excitation circuit in conjunction with non-response of the measuring system of the measuring circuit producing a fault function signal.

2. The distance protection apparatus as defined in claim 1, wherein:

said monitoring circuit contains a second comparison logic circuit having an input side connected with the output of the starter circuit and with the output side of the measuring circuit and in the event of non-response of the excitation circuit in conjunction with response of the measuring system of the measuring circuit producing a fault function signal.

3. The distance protection apparatus as defined in claim 1, wherein:

the measuring circuit comprises at least one measuring system whose characteristic in the complex impedance plane can be switched to a trip boundary which excludes the load range.

4. The distance protection apparatus as defined in claim 1, wherein:

the measuring circuit comprises at least one measuring system having a directional element which can be switched in the end stage between two mutually at least approximately null point symmetrical trip boundaries.

5. The distance protection apparatus as defined in claim 3, wherein:

said measuring circuit including a stagger-timing circuit defining a trip boundary switch means;

a timing circuit having an input side and an output side;

said timing circuit being connected in control connection at its input side with said trip boundary switch means of the measuring circuit and at its output side with said at least one measuring system of the measuring circuit;

said timing circuit triggering with a time-delay, in relation to switching-in of the end stage, an additional switching of at least one trip boundary of the measuring system.

* * * * *